(12) United States Patent
Steiner et al.

(10) Patent No.: US 10,767,034 B2
(45) Date of Patent: Sep. 8, 2020

(54) PNEUMATIC TIRE

(71) Applicant: The Goodyear Tire & Rubber Company, Akron, OH (US)

(72) Inventors: Pascal Patrick Steiner, Vichten (LU); Frida Nzulu, Rollingen (LU); Jérôme Joel Daniel Delville, Rehon (FR); Manuela Pompei, Reuler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 25 days.

(21) Appl. No.: 16/120,815

(22) Filed: Sep. 4, 2018

(65) Prior Publication Data

US 2020/0071506 A1  Mar. 5, 2020

(51) Int. Cl.
*C08L 9/06* (2006.01)
*B60C 1/00* (2006.01)
*B60C 11/00* (2006.01)

(52) U.S. Cl.
CPC .............. *C08L 9/06* (2013.01); *B60C 1/0016* (2013.01); *B60C 11/0008* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 5,504,135 A | 4/1996 | Ardrizzi | |
| 6,103,808 A | 8/2000 | Hashimoto | |
| 6,146,520 A | 11/2000 | Gupte | |
| 6,248,929 B1 | 6/2001 | Kaimai | |
| 6,399,697 B1 | 6/2002 | Takasaki | |
| 6,410,816 B2 | 6/2002 | Takasaki | |
| 6,608,125 B2 | 8/2003 | Cruse | |
| 8,312,905 B2 | 11/2012 | Steiner | |
| 2001/0002330 A1 | 5/2001 | Benenati | |
| 2002/0000280 A1 | 1/2002 | Scholl | |
| 2002/0045697 A1 | 4/2002 | Sohnen | |
| 2003/0130535 A1 | 7/2003 | Deschler | |
| 2004/0261927 A1* | 12/2004 | Weydert | B60C 1/0016 152/209.5 |
| 2007/0175557 A1* | 8/2007 | Puhala | B60C 1/0016 152/209.5 |
| 2013/0267640 A1 | 10/2013 | Lopez | |
| 2013/0274404 A1 | 10/2013 | Vasseur | |
| 2013/0296471 A1 | 11/2013 | Lesage | |
| 2016/0159157 A1* | 6/2016 | Jacoby | B60C 11/005 152/450 |
| 2017/0114212 A1 | 4/2017 | Pompei et al. | |
| 2017/0145195 A1 | 5/2017 | Isitman et al. | |

FOREIGN PATENT DOCUMENTS

| | | |
|---|---|---|
| EP | 0839891 A2 | 5/1998 |
| ES | 2122917 A1 | 12/1998 |
| JP | 8-176348 * | 7/1996 |
| JP | 2002097369 A | 4/2002 |

OTHER PUBLICATIONS

European Search Report for Application No. EP19194442 dated Jan. 28, 2020.

* cited by examiner

*Primary Examiner* — Robert T Butcher
(74) *Attorney, Agent, or Firm* — John D. DeLong

(57) ABSTRACT

The present invention is directed to a pneumatic tire having a tread comprising a vulcanizable rubber composition comprising, based on 100 parts by weight of elastomer (phr), (A) from about 30 to about 50 phr of a first solution polymerized styrene-butadiene rubber having a glass transition temperature (Tg) ranging from −80° C. to −50° C. and functionalized with an alkoxysilane group and at least one functional group selected from the group consisting of primary amines and thiols;

(B) from about 30 to about 50 phr of a second solution polymerized styrene-butadiene rubber having a glass transition temperature (Tg) ranging from −40° C. to −10° C. and functionalized with an alkoxysilane group and at least one functional group selected from the group consisting of primary amines and thiols;

(C) from 0 to about 40 phr of a polyisoprene having a cis 1,4 content greater than 95 percent;

(D) from 20 to 60 phr of a hydrocarbon resin having a Tg of at least 30° C.;

(E) from 40 to 80 phr of an oil; and (F) from 120 to 180 phr of silica.

15 Claims, No Drawings

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

SUMMARY OF THE INVENTION

The present invention is directed to a pneumatic tire having a tread comprising a vulcanizable rubber composition comprising, based on 100 parts by weight of elastomer (phr), (A) from about 30 to about 50 phr of a first solution polymerized styrene-butadiene rubber having a glass transition temperature (Tg) ranging from −80° C. to −50° C. and functionalized with an alkoxysilane group and at least one functional group selected from the group consisting of primary amines and thiols;

(B) from about 30 to about 50 phr of a second solution polymerized styrene-butadiene rubber having a glass transition temperature (Tg) ranging from −40° C. to −10° C. and functionalized with an alkoxysilane group and at least one functional group selected from the group consisting of primary amines and thiols;

(C) from 0 to about 40 phr of a polyisoprene having a cis 1,4 content greater than 95 percent;

(D) from 20 to 60 phr of a hydrocarbon resin having a Tg of at least 30° C.;

(E) from 40 to 80 phr of an oil; and (F) from 120 to 180 phr of silica.

DESCRIPTION OF THE INVENTION

There is disclosed to a pneumatic tire having a tread comprising a vulcanizable rubber composition comprising, based on 100 parts by weight of elastomer (phr), (A) from about 30 to about 50 phr of a first solution polymerized styrene-butadiene rubber having a glass transition temperature (Tg) ranging from −80° C. to −50° C. and functionalized with an alkoxysilane group and at least one functional group selected from the group consisting of primary amines and thiols;

(B) from about 30 to about 50 phr of a second solution polymerized styrene-butadiene rubber having a glass transition temperature (Tg) ranging from −40° C. to −10° C. and functionalized with an alkoxysilane group and at least one functional group selected from the group consisting of primary amines and thiols;

(C) from 0 to about 40 phr of a polyisoprene having a cis 1,4 content greater than 95 percent;

(D) from 20 to 60 phr of a hydrocarbon resin having a Tg of at least 30° C.;

(E) from 40 to 80 phr of an oil; and (F) from 120 to 180 phr of silica.

The rubber composition includes from 30 to 50 phr of a first solution polymerized styrene-butadiene rubber with a Tg ranging from from −80° C. to −50° C., and from 30 to 50 phr of a second solution polymerized styrene-butadiene rubber having a glass transition temperature (Tg) ranging from −40° C. to −10° C. Each of the first and second styrene-butadiene rubbers are independently functionalized with an alkoxysilane group and at least one of a primary amine group and thiol group. In one embodiment, the styrene-butadiene rubber is obtained by copolymerizing styrene and butadiene, and characterized in that the styrene-butadiene rubber has a primary amino group and/or thiol group and an alkoxysilyl group which are bonded to the polymer chain either within the chain or at the chain end. In one embodiment, the alkoxysilyl group is an ethoxysilyl group.

The primary amino group and/or thiol group may be bonded to any of a polymerization initiating terminal, a polymerization terminating terminal, a main chain of the styrene-butadiene rubber and a side chain, as long as it is bonded to the styrene-butadiene rubber chain. However, the primary amino group and/or thiol group is preferably introduced to the polymerization initiating terminal or the polymerization terminating terminal, in that the disappearance of energy at a polymer terminal is inhibited to improve hysteresis loss characteristics.

Further, the content of the alkoxysilyl group bonded to the polymer chain of the (co)polymer rubber is preferably from 0.5 to 200 mmol/kg of (styrene-butadiene rubber. The content is more preferably from 1 to 100 mmol/kg of styrene-butadiene rubber, and particularly preferably from 2 to 50 mmol/kg of styrene-butadiene rubber.

The alkoxysilyl group may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

The styrene-butadiene rubber can be produced by polymerizing styrene and butadiene in a hydrocarbon solvent by anionic polymerization using an organic alkali metal and/or an organic alkali earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting deblocking, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO 2007/047943.

In one embodiment, and as taught in U.S. Pat. No. 7,342,070, the styrene-butadiene rubber is of the formula (I) or (II)

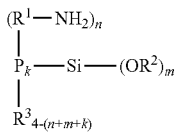

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

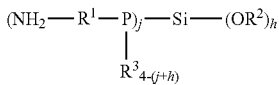

wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4.

The terminating agent compound having a protected primary amino group and an alkoxysilyl group may be any of various compounds as are known in the art. In one embodiment, the compound having a protected primary amino group and an alkoxysilyl group may include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)-aminoethyltriethoxysilne, N,N-bis(trimethylsilyl)aminoethylmethyldimethoxysilane, N,N-bis(trimethylsilyl)aminoethylmethyldiethoxysilane, etc., and preferred are 1-trimethylsilyl-2,2-dimethoxy-1-aza-2-silacyclopentane, N,N-bis(trimethylsilyl) aminopropylmethyldimethoxysilane and N,N-bis(trimethylsilyl)aminopropylmethyldiethoxysilane. In one embodiment, the compound having a protected primary amino group and an alkoxysilyl group is N,N-bis(trimethylsilyl)aminopropyltriethoxysilane.

In one embodiment, the compound having a protected primary amino group and an alkoxysilyl group may be any compound of formula III $$RN-(CH_2)xSi(OR')_3, \quad \quad III$$

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20. In one embodiment, at least one R' group is an ethyl radical. By appropriate post-treatment to yield a primary amine, it is meant that subsequent to reaction of the living polymer with the compound having a protected primary amino group and an alkoxysilyl group, the protecting groups are removed. For example, in the case of bis(trialkylsilyl) protecting group as in N,N-bis(trimethylsilyl)aminopropyltriethoxysilane, hydrolysis is used to remove the trialkylsilyl groups and leave the primary amine.

In one embodiment, the rubber composition includes from about 50 to about 90 phr of styrene-butadiene rubber functionalized with an alkoxysilane group and a primary amine group or thiol group.

Suitable styrene-butadiene rubbers functionalized with an alkoxysilane group and a primary amine group are available commercially, such as HPR 340 from Japan Synthetic Rubber (JSR).

In one embodiment, the solution polymerized styrene-butadiene rubber is as disclosed in WO 2007/047943 and is functionalized with an alkoxysilane group and a thiol, and comprises the reaction product of a living anionic polymer and a silane-sulfide modifier represented by the formula VII $$(R^4O)_xR^4{}_ySi-R^5-S-SiR^4{}_3 \quad \quad VII$$

wherein Si is silicon; S is sulfur; O is oxygen; x is an integer selected from 1, 2 and 3; y is an integer selected from 0, 1, and 2; x+y=3; $R^4$ is the same or different and is $(C_1-C_{16})$ alkyl; and R' is aryl, and alkyl aryl, or $(C_1-C_{16})$ alkyl. In one embodiment, $R^5$ is a $(C_1-C_{16})$ alkyl. In one embodiment, each $R^4$ group is the same or different, and each is independently a $C_1-C_5$ alkyl, and $R^5$ is $C_1-C_5$ alkyl.

The first solution polymerized styrene-butadiene rubber with a Tg ranging from from −80° C. to −50° C., and the second solution polymerized styrene-butadiene rubber having a glass transition temperature (Tg) ranging from −40° C. to −10° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

Suitable styrene-butadiene rubbers functionalized with an alkoxysilane group and a thiol group are available commercially, such as Sprintan SLR 3402 and SLR 4602 from Trinseo.

Another component of the rubber composition is from about 0 to about 40 phr of polyisoprene rubber having a cis 1,4 content greater than 95 percent. Suitable polyisoprene rubbers may be prepared synthetically, for example, by organic solution polymerization of isoprene or as natural rubber.

The rubber composition includes from 40 to 80 phr of a processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, and vegetable oils such as sunflower, soybean, and safflower oils.

In one embodiment, the rubber composition includes a low PCA oil. Suitable low PCA oils include but are not limited to mild extraction solvates (MES), treated distillate aromatic extracts (TDAE), and heavy naphthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy naphthenic oils generally have a Tg in a range of from about −42° C. to about −48° C. A suitable measurement for Tg of TDAE oils is DSC according to ASTM E1356, or equivalent.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

Suitable vegetable oils include, for example, soybean oil, sunflower oil and canola oil which are in the form of esters containing a certain degree of unsaturation.

The rubber composition includes from 20 to 60 phr of a hydrocarbon resin having a Tg greater than 30° C.

Representative hydrocarbon resins include coumarone-indene-resins, petroleum resins, C5/C9 resins, terpene polymers, alphamethyl styrene resins and mixtures thereof.

Coumarone-indene resins are commercially available in many forms with melting points ranging from 10 to 160° C. (as measured by the ball-and-ring method). Preferably, the melting point ranges from 30 to 100° C. Coumarone-indene resins are well known. Various analysis indicate that such resins are largely polyindene; however, typically contain random polymeric units derived from methyl indene, coumarone, methyl coumarone, styrene and methyl styrene.

Petroleum resins are commercially available with softening points ranging from 10° C. to 120° C. Preferably, the softening point ranges from 30 to 100° C. Suitable petroleum resins include both aromatic and nonaromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene. Copolymers of these monomer with one another or with aromatic such as styrene and alphamethyl styrene are also included.

In one embodiment the resin is an aromatic modified polydicyclopentadiene.

Terpene polymers are commercially produced from polymerizing a mixture of beta pinene in mineral spirits. The resin is usually supplied in a variety of melting points ranging from 10° C. to 135° C.

In one embodiment, the resin is derived from styrene and alphamethylstyrene. It is considered that, in one aspect, its glass transition temperature (Tg) characteristic combined with its molecular weight (Mn) and molecular weight distribution (Mw/Mn) provides a suitable compatibility of the resin in the rubber composition, the degree of compatibility being directly related to the nature of the rubber composition.

The presence of the styrene/alphamethylstyrene resin with a rubber blend which contains the presence of the styrene-butadiene elastomer is considered herein to be beneficial because of observed viscoelastic properties of the tread rubber composition such as complex and storage modulus, loss modulus tan.delta and loss compliance at different temperature/frequency/strain as hereinafter generally described.

The properties of complex and storage modulus, loss modulus, tan.delta and loss compliance are understood to be generally well known to those having skill in such art. They are hereinafter generally described.

The molecular weight distribution of the resin is visualized as a ratio of the resin's molecular weight average (Mw) to molecular weight number average (Mn) values and is considered herein to be in a range of about 1.5/1 to about 2.5/1 which is considered to be a relatively narrow range. This believed to be advantageous because of the selective compatibility with the polymer matrix and because of a contemplated use of the tire in wet and dry conditions over a wide temperature range.

The glass transition temperature Tg of the copolymer resin is considered herein to be in a range of about 20° C. to about 100° C., alternatively about 30° C. to about 80° C., depending somewhat upon an intended use of the prepared tire and the nature of the polymer blend for the tire tread. A suitable measurement of TG for resins is DSC according to ASTM D6604 or equivalent.

The styrene/alphamethylstyrene resin is considered herein to be a relatively short chain copolymer of styrene and alphamethylstyrene with a styrene/alphamethylstyrene molar ratio in a range of about 0.40 to about 1.50. In one aspect, such a resin can be suitably prepared, for example, by cationic copolymerization of styrene and alphamethylstyrene in a hydrocarbon solvent.

Thus, the contemplated styrene/alphamethylstyrene resin can be characterized, for example, by its chemical structure, namely, its styrene and alphamethylstyrene contents and softening point and also, if desired, by its glass transition temperature, molecular weight and molecular weight distribution.

In one embodiment, the styrene/alphamethylstyrene resin is composed of about 40 to about 70 percent units derived from styrene and, correspondingly, about 60 to about 30 percent units derived from alphamethylstyrene. In one embodiment, the styrene/alphamethylstyrene resin has a softening point according to ASTM No. E-28 in a range of about 80° C. to about 145° C.

Suitable styrene/alphamethylstyrene resin is available commercially as Resin 2336 from Eastman or Sylvares SA85 from Arizona Chemical.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 120 to about 180 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP and Z165GR and silicas available from Degussa AG with, for example, designations VN2 and VN3, etc.

The vulcanizable rubber composition may include from 1 to 10, alternative up to about 5 phr of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

It may be preferred to have the rubber composition for use in the tire component to additionally contain a conventional sulfur containing organosilicon compound. Examples of suitable sulfur containing organosilicon compounds are of the formula:

Z-Alk-S$_n$-Alk-Z    VIII in which Z is selected from the group consisting of

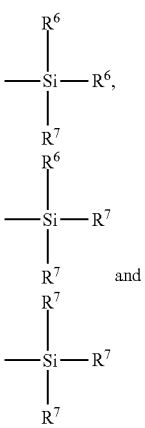

and where R$^6$ is an alkyl group of 1 to 4 carbon atoms, cyclohexyl or phenyl; R$^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula VIII, preferably Z is

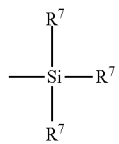

where R$^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 5 to 15 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a tread of a tire.

The pneumatic tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

EXAMPLE I

This example illustrates the advantage of a rubber composition according to the invention. Rubber compounds were mixed according to the formulations shown in Table 1, with amounts given in phr. Each compound also contained standard amounts of curatives. The compounds were cured and tested for physical properties as shown in Table 2.

TABLE 1

| Sample No. | 1 | 2 | 3 | 4 | 5 |
|---|---|---|---|---|---|
| Styrene-Butadiene [1] | 40 | 0 | 0 | 0 | 0 |
| Styrene-Butadiene [2] | 50 | 0 | 0 | 0 | 0 |
| Styrene-Butadiene [3] | 0 | 68 | 68 | 0 | 42 |
| Styrene-Butadiene [4] | 0 | 32 | 32 | 100 | 38 |
| Polybutadiene [5] | 10 | 0 | 0 | 0 | 0 |
| Natural Rubber | 0 | 0 | 0 | 0 | 20 |
| Silica | 112 | 112 | 140 | 140 | 155 |
| Resin [6] | 12 | 0 | 0 | 0 | 0 |

TABLE 1-continued

| Sample No. | 1 | 2 | 3 | 4 | 5 |
|---|---|---|---|---|---|
| Resin [7] | 0 | 25 | 28 | 20 | 30 |
| Oil [8] | 39 | 30 | 55 | 63 | 68 |

[1] Solution polymerized SBR with styrene content of 40% and 1, 2-vinyl content of 14% Tg = −34 °C., as SLR6430 from Trinseo.
[2] Solution polymerized SBR with styrene content of 34% and 1, 2-vinyl content of 38% Tg = −25 °C., as Tufdene E680 from Asahi Chemical.
[3] Solution polymerized SBR with styrene content of 15% and 1, 2-vinyl content of 30%, Tg = −60 °C., functionalized with alkoxysilane and thiol groups, as SLR3402 from Trinse.
[4] Solution polymerized SBR with styrene content of 27% and 1, 2-vinyl content of 57%, Tg = −27 °C., functionalized with alkoxysilane and amino groups, as HPR 355H from JSR.
[5] High cis polybutadiene, obtained as Budene 1223 from The Goodyear Tire & Rubber Company
[6] Copolymer of styrene and alpha-methylstyrene, Tg = +39° C., obtained as Sylvatraxx4401 from Arizona Chemicals
[7] Hydrocarbon resin of aromatic modified polydicyclopentadiene, Tg = 54 C., as Oppera PR383 from ExxonMobil.
[8] Extender oil from elastomers and added oil

TABLE 2

| Sample No. | 1 | 2 | 3 | 4 | 5 |
|---|---|---|---|---|---|
| Wet PerformanceProperties[1] | | | | | |
| Wet Performance Index | 100 | 86 | 94 | 106 | 104 |
| Rolling Resistance Properties[2] | | | | | |
| Rolling Resistance Index | 100 | 134 | 114 | 98 | 103 |
| Wear Properties[3] | | | | | |
| Wear Index | 100 | 146 | 124 | 77 | 110 |

[1]Index based on friction coefficient measurement; higher index value indicates better performance.
[2]Index based on tangent delta measured at 6% strain, frequency 7.8 Hz, 30 C. Higher index value indicates better performance. Data according to METRAVIB Analyzer. Higher index indicates better performance.
[3]Index based on data according to DIN 53516 abrasion resistance test procedure using a Zwick drum abrasion unit, model 6102 with 2.5 Newtons force. Higher index value indicates better performance. DIN standards are German test standards. Higher index indicates better performance.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a tread comprising a vulcanizable rubber composition comprising, based on 100 parts by weight of elastomer (phr),
   (A) from about 30 to about 50 phr of a first solution polymerized styrene-butadiene rubber having a glass transition temperature (Tg) ranging from −80° C. to −50° C. and functionalized with an alkoxysilane group and at least one functional group selected from the group consisting of primary amines and thiols;
   (B) from about 30 to about 50 phr of a second solution polymerized styrene-butadiene rubber having a glass transition temperature (Tg) ranging from −40° C. to −10° C. and functionalized with an alkoxysilane group and at least one functional group selected from the group consisting of primary amines and thiols;
   (C) from 0 to about 40 phr of a polyisoprene having a cis 1,4 content greater than 95 percent selected from the group consisting of natural rubber and synthetic polyisoprene;
   (D) from 20 to 60 phr of a hydrocarbon resin having a Tg of at least 30° C.;
   (E) from 40 to 80 phr of an oil; and
   (F) from 120 to 180 phr of silica.

2. The pneumatic tire of claim 1, wherein the first solution polymerized styrene butadiene rubber is functionalized with an alkoxysilane group and a thiol group, and the second solution polymerized styrene butadiene rubber is functionalized with an alkoxysilane group and a primary amine group.

3. The pneumatic tire of claim 1, wherein the first solution polymerized styrene butadiene rubber is functionalized with an alkoxysilane group and a primary amine group, and the second solution polymerized styrene butadiene rubber is functionalized with an alkoxysilane group and a thiol group.

4. The pneumatic tire of claim 1, wherein the hydrocarbon resin is present in an amount ranging from 25 to 35 phr.

5. The pneumatic tire of claim 1, wherein the amount of silica ranges from 145 to 175 phr.

6. The pneumatic tire of claim 1, wherein the amount of silica ranges from 155 to 165 phr.

7. The pneumatic tire of claim 1, wherein the hydrocarbon resin is selected from the group consisting of styrene/alphamethylstyrene copolymer resins, C5/C9 copolymer resins, dicyclopentadiene resins, and aromatic dicyclopentadiene resins.

8. The pneumatic tire of claim 1, wherein the resin is an aromatic modified dicyclopentadiene resin.

9. The pneumatic tire of claim 1, wherein the resin is a styrene/alphamethylstyrene copolymer resins.

10. The pneumatic tire of claim 1, wherein at least one of the first and second solution polymerized styrene-butadiene rubber functionalized with an alkoxysilane group and a primary amine group is represented by the formula (1) or (2)

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

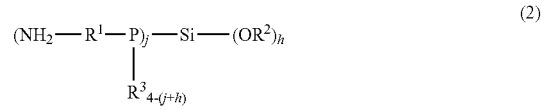

wherein P, $R^1$, $R^2$ and $R^3$ have the same definitions as given for the above-mentioned formula (1), j is an integer of 1 to 3, and h is an integer of 1 to 3, with the provision that j+h is an integer of 2 to 4.

11. The pneumatic tire of claim 1, wherein the solution polymerized styrene-butadiene rubber is functionalized with an alkoxysilane group and a primary amine group comprises the reaction product of a living polymer chain and a terminating agent of the formula

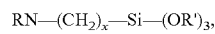

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20.

12. The pneumatic tire of claim 1 wherein at least one of the first and second solution polymerized styrene-butadiene rubber is functionalized with an alkoxysilane group and a thiol, and comprises the reaction product of a living anionic polymer and a silane-sulfide modifier represented by the formula $$(R^4O)_xR^4_ySi\text{—}R^5\text{—}S\text{—}SiR^4_3$$

wherein Si is silicon; S is sulfur; O is oxygen; x is an integer selected from 1, 2 and 3; y is an integer selected from 0, 1, and 2; x+y=3; $R^4$ is the same or different and is ($C_1$-$C_{16}$) alkyl; and R' is aryl, and alkyl aryl, or ($C_1$-$C_{16}$) alkyl.

13. The pneumatic tire of claim 1, wherein the rubber composition comprises from 35 to 45 phr of the first solution polymerized styrene butadiene rubber, from 35 to 45 phr of the second solution polymerized styrene butadiene rubber, and from 10 to 30 phr of the polyisoprene.

14. A pneumatic tire having a tread comprising a vulcanizable rubber composition comprising, based on 100 parts by weight of elastomer (phr),
  (A) from about 30 to about 50 phr of a first solution polymerized styrene-butadiene rubber having a glass transition temperature (Tg) ranging from −80° C. to −50° C. and functionalized with an alkoxysilane group and a thiol group;
  (B) from about 30 to about 50 phr of a second solution polymerized styrene-butadiene rubber having a glass transition temperature (Tg) ranging from −40° C. to −10° C. and functionalized with an alkoxysilane group and a primary amine group;
  (C) from 0 to about 40 phr of a polyisoprene having a cis 1,4 content greater than 95 percent selected from the group consisting of natural rubber and synthetic polyisoprene;
  (D) from 20 to 60 phr of a hydrocarbon resin having a Tg of at least 30° C.;
  (E) from 40 to 80 phr of an oil; and
  (F) from 120 to 180 phr of silica.

15. A pneumatic tire having a tread comprising a vulcanizable rubber composition comprising, based on 100 parts by weight of elastomer (phr),
  (A) from about 30 to about 50 phr of a first solution polymerized styrene-butadiene rubber having a glass transition temperature (Tg) ranging from −80° C. to −50° C. and functionalized with an alkoxysilane group and a primary amine group;
  (B) from about 30 to about 50 phr of a second solution polymerized styrene-butadiene rubber having a glass transition temperature (Tg) ranging from −40° C. to −10° C. and functionalized with an alkoxysilane group and a thiol group;
  (C) from 0 to about 40 phr of a polyisoprene having a cis 1,4 content greater than 95 percent selected from the group consisting of natural rubber and synthetic polyisoprene;
  (D) from 20 to 60 phr of a hydrocarbon resin having a Tg of at least 30° C.;
  (E) from 40 to 80 phr of an oil; and
  (F) from 120 to 180 phr of silica.

* * * * *